Nov. 24, 1936.   L. J. STOUT   2,061,814
FLUID CONNECTION AND VALVE ASSEMBLY
Filed Feb. 23, 1934    3 Sheets-Sheet 1
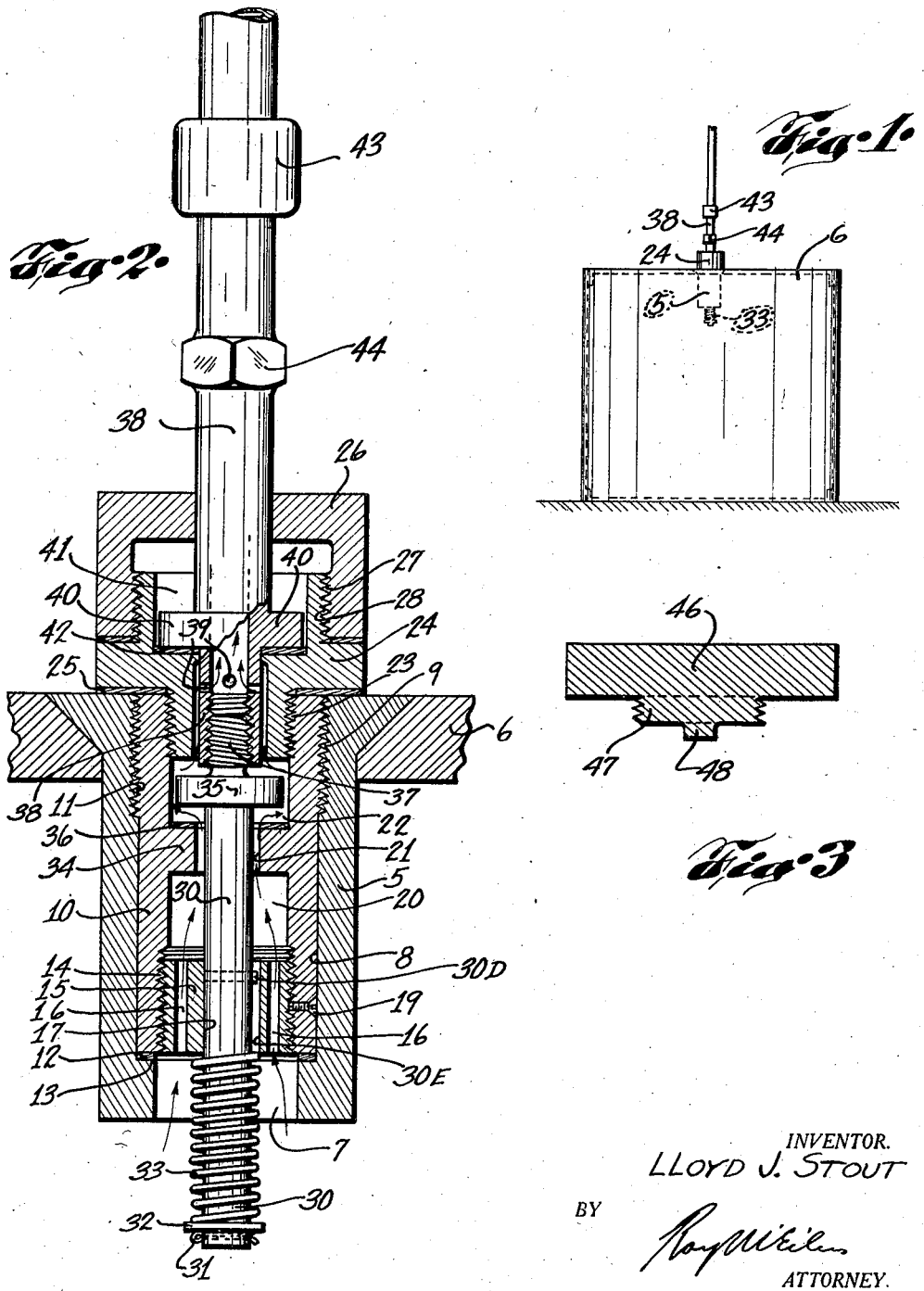
INVENTOR.
LLOYD J. STOUT
BY
ATTORNEY.

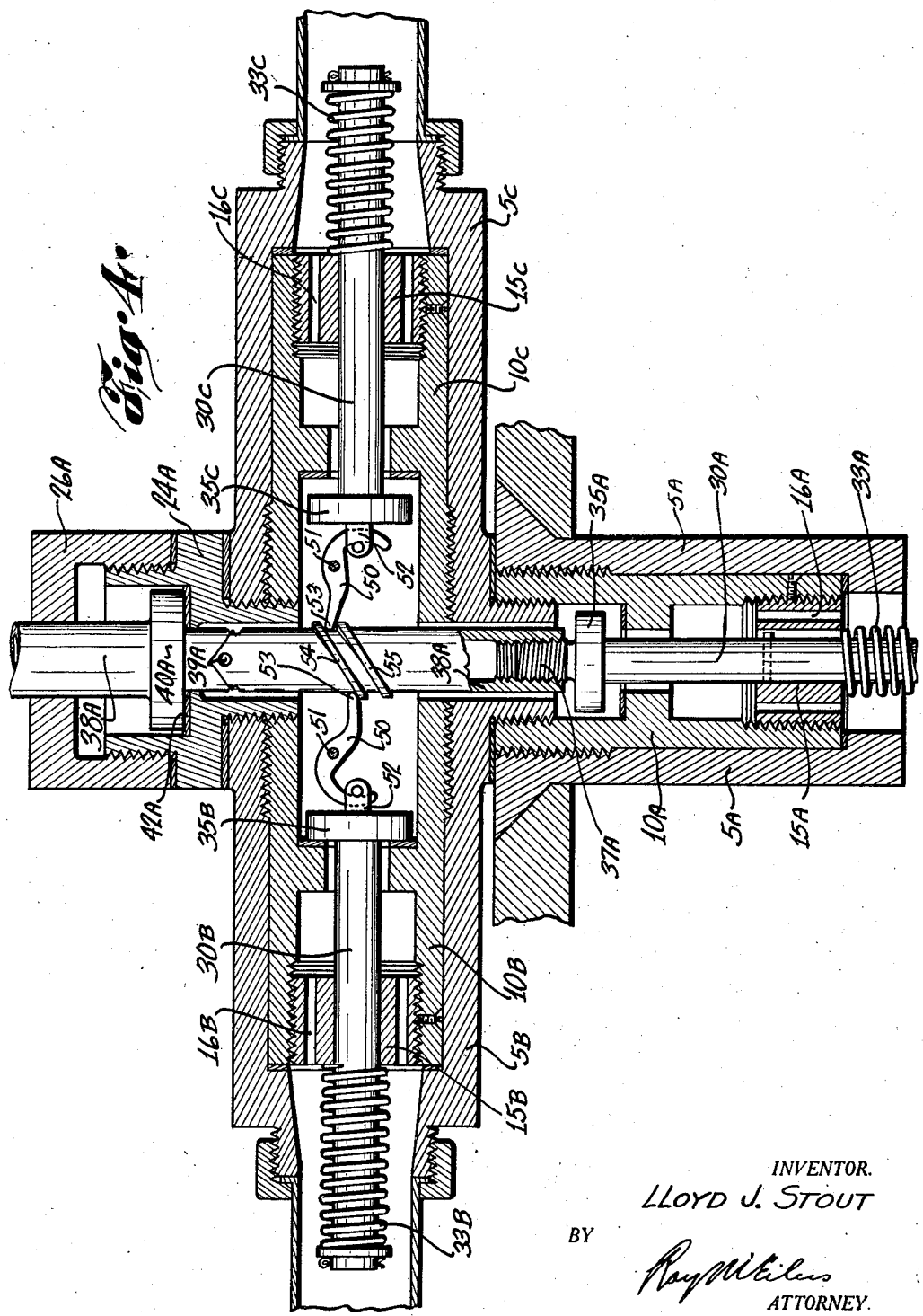

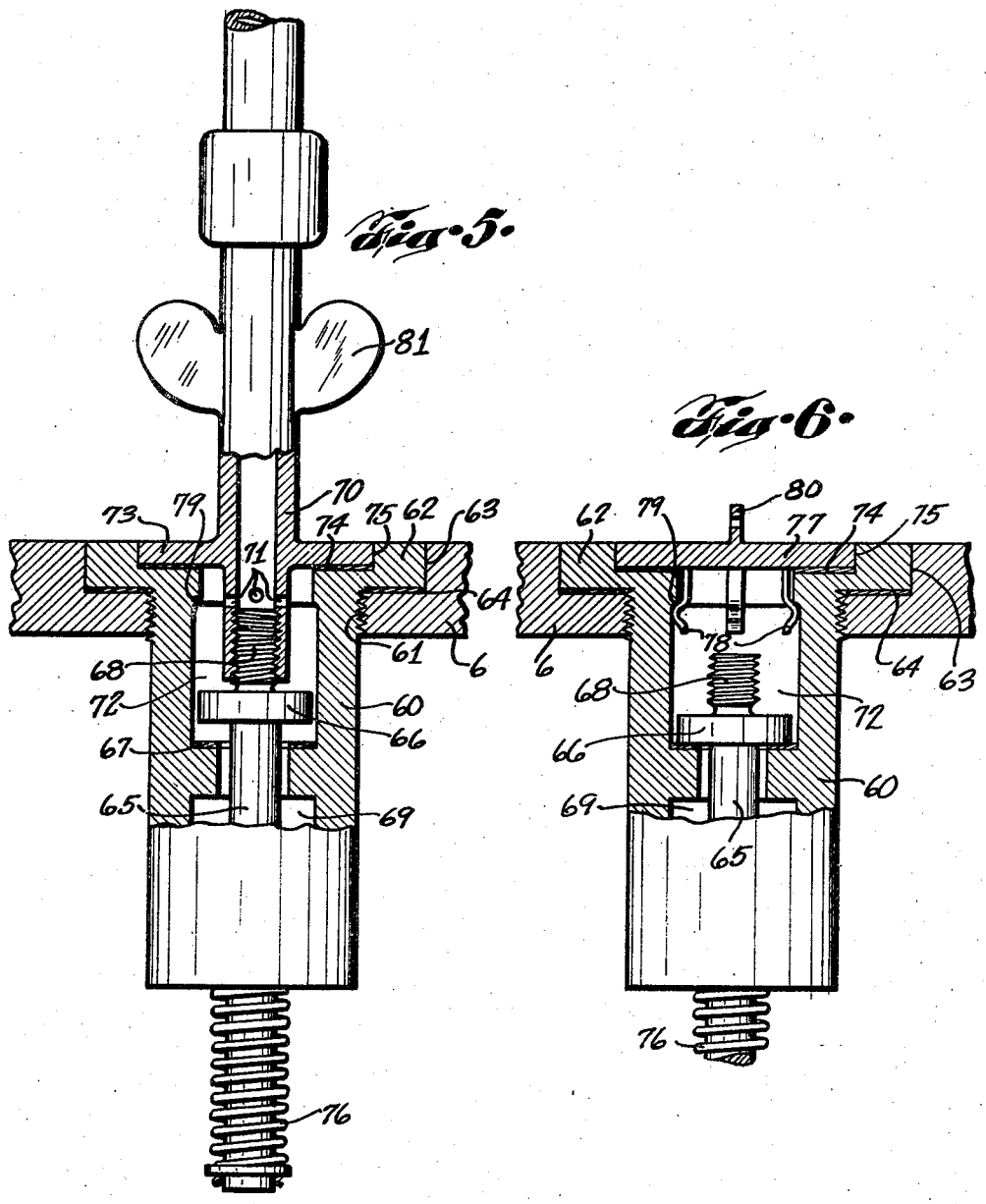

Patented Nov. 24, 1936

2,061,814

UNITED STATES PATENT OFFICE 2,061,814

FLUID CONNECTION AND VALVE ASSEMBLY

Lloyd J. Stout, Chicago, Ill., assignor to Alfred L. Stoddard, Chicago, Ill.

Application February 23, 1934, Serial No. 712,565

12 Claims. (Cl. 284—14)

This invention relates to improvements in fluid connection and valve assemblies, and more particularly to a combined valve and pipe-connecting unit of such a nature as to provide an easily detachable fluid connection, together with an automatic sealing valved port for fluid containers.

An object of the invention is to provide a valved connection enabling a quickly made and severed connection from an associated container, to a fluid line, which may be connected, for example, to a pump providing for the transfer of fluid to or from the container, the device being of such a nature as to provide a substantially perfect fluid seal, following any desired fluid exchange.

A further object of the invention is to provide a detachable valved connection for fluid containers, in which the valve is, or may be, actuated solely through the agency such as a pipe or tube, by which the fluid connection is established or broken.

Yet another object of the invention is attained in the provision of a self-sealing valved connection which provides automatically for closure of the container immediately following the desired fluid exchange into or out of such container; a valve which will permit sealing of a container or system, for example, while a pump connected thereto remains in operation, thereby minimizing a fluid loss sometimes incident to the making and breaking of the connections heretofore employed.

A still further object of the invention is attained, in a device of the class heretofore referred to, in an improved facility for application of a gauge, with minimum fluid losses, to determine either the extent of exhaustion of the associated container, or a pressure reading thereof. This result is attained in an improved volumetric relation of the chambered portion of the body of the unit, in respect to its valve and port areas.

Yet an additional object of the invention consists in the provision of a compound valve and fluid connection unit, so designed that the seating of one valve, and the lifting of a companion valve, are always properly related in that one of the valves cannot be opened without closing or seating the other thereof, the arrangement further being such that a reverse action of the two related valve elements normally takes place upon disengagement of a fluid connection with the fitting or unit.

An additional object of the invention is attained in the provision of a unit or fitting for the purposes noted, which embodies a plurality of independently operable, compound valve assemblies together with a fluid connection or other means operable to actuate these assemblies either independently of, or in predetermined relation to each other. More specifically pointed out, this plural arrangement enables a connection to a pump, for example, and by rotation of the pump connection any one or more of a plurality of the compound valves may be opened or closed individually, or at the same time.

The valve units of my invention objectively attain a simplicity of construction in which all parts are easily replaced and inexpensive of manufacture and assembly, producing valve connection units of practically universal application, quickly and easily installed, and require no special tools for installation or operation; a valve unit which provides a detachable connection for the introduction of fluid into, or its removal from a container with a minimum loss, and which is characterized by a low cost of manufacture and may be constructed of readily obtainable stock materials with a minimum of machine operations.

The foregoing and other objects will more fully appear from the following detailed description of presently referred embodiments of the invention, as illustrated in the accompanying drawings, in which:

Fig. 1 is a side elevation of a valved fluid connection unit as installed in a metal container; Fig. 2 is a longitudinal sectional elevation of the device of Fig. 1; Fig. 3 is a transverse section of a threaded cap element which may be applied to the body of the device of Figs. 1 and 2, when the fluid connection thereto is removed; Fig. 4 is a longitudinal section taken similarly to that of Fig. 2, and illustrating the parts and assembly of a multi-valve unit providing for a plurality of exteriorly operable valve connections to separate containers or systems arranged in controlled relation to the several valves of the unit; Fig. 5 is a longitudinal sectional elevation of a modified, somewhat simplified, valved connection unit, and Fig. 6 illustrates, by sectional elevation, a modified arrangement for sealing the unit when not in service.

Referring now by characters of reference to the drawings, a sleeve, plug or shell 5 is, in certain cases, secured as by sweating-in or soldering to the wall 6 of a metal container. The plug 5 is provided with a longitudinal bore, in the drawings shown as consisting of an end portion 7 of reduced diameter opening into a portion 8 of somewhat larger diameter, the opposite or outer end of which is tapped to receive a hollow threaded body 10, provided with external threads 11 engaging the threads 9 of the tapped portion of the sleeve. The body 10 is removably secured in place in the plug 5 by employing a sealing element or gasket 12 seated upon a shoulder 13 therefor, resulting from the stepped diameters of the bore in the shell 5. It will appear that, as the body 10 through its threads 11 is screwed into the sleeve 5, it is brought tightly to bear against the gasket 12.

The innermost end of the body 10 is preferably threaded as at 14 for the reception of an externally threaded plate element 15, provided with fluid passages 16 and a central opening 17, constituting, as will hereinafter appear, a valve-stem guide. The disc 15 is adjustably positioned in the body 10 and is prevented from unthreading by a set-screw 19 extending through a tapped opening in the body 10. By unthreading the screw 19, the disc 15 may be adjusted in the body 10 so as to increase or decrease the tension of the spring 33. A chamber 20 is formed in the body 10 just upwardly or outwardly from the disc 15, and communicates through a central aperture 21 with a chamber 22. The opening 21 is of such size and shape as to permit fluid to pass the stem, between chambers 20 and 22, when the valve (hereinafter described) is open. The upper or outer portion of the body 10 is provided with internal threads 23 serving to receive an external threaded portion of relatively reduced diameter constituted by part of a chambered plug structure 24, the structure 24 being preferably detachably seated in fluid-tight relation into and upon the body 10 and the sleeve 5, through the agency of a gasket 25.

The plug element 24 is, by preference, formed of two parts, viz., the plug body which is threadedly received by the outer end of the body 10, and a centrally apertured, internally threaded cap element 26, the internal threads 27 of which serve to engage the external threads 28 of the body.

Proceeding now to a description of the movable valve elements of the unit, there is provided a central axially movable valve stem 30 operable within the body 10. This valve stem or rod is provided with a transverse opening near its innermost end, which serves to receive a pin or cotter key 31 as a support for a washer 32 forming an inner abutment for a coil type compression spring 33. This spring finds its opposite abutment against the disc 15, but as will appear from the drawings, will not obstruct the fluid openings 16 into the chamber 20. The valve rod 30, as has appeared, is guidingly engaged by the central aperture of the disc 15 and extends through the opening 21, preferably formed in an integral bridge or partition member 34, located transversely and intermediately of the body 10. The valve stem or rod 30 carries, either as an integral part or as a separate member secured thereto, a sealing valve 35, preferably of disc form, and when the valve is closed, serves to engage in sealing relation, a valve seat 36 preferably constituted by an annulus or washer element of kangaroo leather of even thickness over its area, and preferably secured, as by cementing, to the bridge or partition 34.

The valve rod or stem 30 extends outwardly or upwardly beyond the valve element 35 and its outer end is provided with threads 37. Arranged for threaded connection with the end 37 of the sealing valve, is a tube 38, through which fluid connection may be established, either, into or out of the container or system with which the valve assembly is associated. The innermost end of tube 38 is internally threaded to correspond to the threads 37 on the valve stem 30, and is adapted to extend centrally of the inner or threaded plug portion of the cap structure 24, the internal diameter of the latter being such as to provide for fluid passage around the inner end of the tube 38. The tube 38 is provided just outwardly of its threaded end with a plurality of transverse fluid ports 39, which serve to establish fluid communication between the chamber 22 and the interior of the tube 38. The tube is preferably of heavy wall construction and is provided outwardly of the ports 39 with a valve element 40 which serves to control communication into a chamber 41 of the cap structure 24. The valve 40 is preferably of somewhat larger diameter than the valve 35, although it may be of the same or a somewhat lesser area, and when closed, is seated upon a leather annulus or washer 42 which desirably consists of kangaroo leather found to provide a more efficient seal than other materials heretofore employed for similar purposes. Obviously of course, other materials may be utilized, or for certain purposes within moderate pressure ranges, the valves and valve seats may be ground to provide the requisitely tight fit and sealing effect without the use of auxiliary compressible sealing materials.

It is my preference to actuate the valve 35 by rotation of the tube 38 from a point outside the valve unit. To the end of permitting rotation of the tube 38 while maintaining its fluid connection to a pump or container, I have provided a swivel joint which may be of any suitable type, and indicated at 43. Disposed between the joint 43 and the plug structure 24, is a wrench-receiving head 44 conveniently formed of hexagon shape; this may however take the form of a wing structure such as 81, (Fig. 5), formed after the manner of the usual wing nut, and so obviating the need of a wrench or like tool.

To the end of preventing rotation of the valve 30, and so to permit threading up the connection 37—38, the stem 30 is provided with a projection or pin 30D, operable along a slot 30E in the element 15. This arrangement, while preventing rotation of the rod 30, permits it to reciprocate without restriction.

As will appear from Fig. 2, the distance between centers of the valves 35 and 40, when the stem 30 is threadedly connected to the tube 38, is less than the distance, longitudinally of the body, between centers of the seats 36 and 42. From this it results that when fluid connection is established through the tube 38 to the container 6, the valve 40 constitutes a seal and serves to hold the valve 35 away from its seat 36. An opposite condition however prevails when tube 38 is unthreaded from stem 30; the influence of the spring 33 then causes the valve 35 to be held upon its seat 36 to seal the container from the tube, at which time the tube 38 may be manipulated inwardly or outwardly to constitute a hollow rod or stem for the valve 40, the latter valve then being susceptible of movement into either open or closed position, the latter however only by threading the elements 30 and 38 together. It is thus my preference that the threaded stems of the valves be so related that as the inner valve is opened, the outer is brought to closed position for establishing a connection, and as the inner valve 35 is permitted to close, the valve 40 may be opened, but only after such closure of the inner valve has taken place. It will appear from Fig. 2 that when the valve 35 is closed and stems 30—38 disconnected, the plug structure 24 together with the valve 40 and its stem, may be completely removed from the body 10 and sleeve 5 without appreciable loss or exchange of fluid in the container.

As a provision for completely closing the unit to the atmosphere during periods when there exists no fluid connection to the unit, I provide a cap structure 46, a suggested example of which is shown by Fig. 3, as consisting of a threaded body 47 adapted threadedly to engage the body 10. The body 47 may be similar to the corresponding structure 24, but imperforate, and provided with a depending stem or projection 48 which, when the cup structure is applied to the valve body, serves to engage the outwardly projecting stem portion of the rod 30, and thus positively to hold the valve 35 against its seat 36. The use of the cap 46 is optional, being necessary only under conditions wherein it is desired either to seal the upper or outer end of the valve unit from atmosphere, or under pressure conditions wherein it is necessary or advisable to maintain the valve 35 in closed position in case the spring 33 is inadequate to oppose any extraordinary pressures to which the valve 35 may be subject.

The valve assembly illustrated in Figs. 1, 2, and 3 is designed primarily for use in containers or systems in which there is present a high negative or positive pressure. In other applications, it is preferred to use a valve assembly such as illustrated by Figs. 5 and 6, in which the valve body 60 is, by preference, provided with an externally threaded portion 61 and a flange 62, which, when the valve body is secured in any suitable container such as 6, is, by preference, seated in a countersunk portion 63 of a container wall, so that the face of the flange 62 is substantially flush with the top of the container. To insure a fluid tight joint at this connection, it is preferred to provide a gasket 64 of kangaroo leather on the flange 62. By the above provision, the sleeve 5 employed with the valve assembly illustrated in Figs. 1 and 2 may be eliminated.

The parts of the movable valve elements of the unit, such as the valve stem 65, valve 66, gasket 67, the outer threaded end 68 of the valve 66, and the parts below the chamber 69, are or may be the same as the corresponding parts of Figs. 1 and 2. Arranged for threaded connection with the end 68 is a tube 70. The innermost end of this tube is internally threaded to correspond to the threads 68 on the valve stem 65. The tube 70 is provided just outwardly of its threaded end, with a plurality of fluid ports 71, which serve to establish fluid communication between the chamber 72 and the interior of the tube. The tube 70 is further provided outwardly of the ports, with a valve element 73. This valve, when closed, is seated upon a gasket 74, preferably of kangaroo leather, which is disposed in a valve seat 75 formed in the flange 62. When the stem 65 is threadedly connected to the tube 70, the valve 73 constitutes a seal and serves to hold the valve 66 away from its seat. An opposite condition prevails when the tube 70 is unthreaded from the stem 68, the influence of the spring 76 then causing the valve 66 to be held to its seat to seal the container or system from the tube 70 at which time the tube may be completely removed from the unit. By the above provisions, the plug structure 24 including the cap element 26 employed in the valve structure of Figs. 1 and 2, may be eliminated.

As a preferred provision for completely closing the unit to the atmosphere during periods when the tube assembly is removed from the unit, a cap structure 77 is provided. This cap is imperforate, and is provided with depending arms 78 of resilient material such as spring metal, which, when the cap is seated upon the gasket 74 of the valve body, serve to engage an inwardly projecting shoulder 79 of the valve body 60, and thus to hold the cap against its seat. The cap 77 is provided with a lifting projection 80, provided to facilitate removing the cap structure 5 from the unit. By the above provision the cap structure 46 employed with the assembly of Figs. 1, 2, and 3 may be eliminated. Although the structure of Figs. 5 and 6 includes features not appearing in Figs. 1, 2, and 3, it is obvious, and intended, that certain of these features may be combined in the same structure, even though such features may be here shown in separate figures.

There will have been noted my expressed preference for the use of kangaroo leather as gasketing material throughout the structure. This material has been found by protracted experimental comparisons to provide a superior seal, and better and longer to resist substantial fluid pressures, than rubber, ordinary leather, or other usual gasketing materials.

Besides providing an efficient, quickly operable valved connection for the transfer of fluid from container to container, or from container to a pipe line, it will appear that the disclosed embodiments of the invention inherently provide for the relief of excess pressure in a fluid container when the line is not connected. Either valve 35 or 66, when free to move outwardly against the loading of the valve spring, will serve as a safety valve, opening under a pressure governed by the spring loading which is determined according to the threaded adjustment of element 15. By setting this element more closely to the adjacent end of the valve body, the effective spring loading is increased and thus the valve may be adjusted to open at a higher pressure that when the disc 15 is threaded farther into the valve body.

The present application describes and claims the valve structure per sé, without specific claim to combinations resulting from its application and use, in this connection attention being directed to my copending application filed Feb. 23, 1934, and bearing Serial No. 712,566 and illustrating an application of the valved connection to apparatus for dispensing beer or other fluid from a supply container.

It will be noted that the construction of the valve connection unit and the arrangement of the compound valve elements and seats are such that the valve may be sealed by manipulation of the tube 38 when serving as a pump connection, for example, for the exhaustion of a refrigeration system. After a sufficient degree of vacuum has been obtained, the pipe to the pump may be disconnected without appreciable loss of vacuum. The same advantages will obviously prevail, in respect to the use of my device when employed for the charging of a container with a fluid under, as well as over, atmospheric pressures. It will also appear that through removal of the cap structure 46 and the substitution of the connecting tube 38 and cap structure 24, there is provided a means of access at will, to any chamber of any machine, device, container, or other apparatus, and that during such connection, there is automatically provided an outer or auxiliary seal which operates at all times in proper relation to the inner valve such as 35, constituting the main valve element of the sealing mechanism which is attached to the chamber, system or apparatus.

It will also appear that the described valve connection provides an agency such that the pressure, either positive or negative, or any chamber or system may be determined at any time by the attachment of a suitable gauge connected to the tube 38. The device enables a gauge reading to be taken, and the gauge to be removed without appreciable fluid transfer taking place between the interior of the container and the atmosphere, such transfer being at all times positively precluded due to the provision of the auxiliary outer valve, such as 40.

The valve connection of my invention further provides an efficient arrangement for an injection of fluids into a closed system or container, for example, enables the introduction of sulphur dioxide, ammonia, or other fluids without appreciable injection loss, and in a system employing a plurality of units such as a refrigerating system, the individual units may be installed in, or removed from a common line or system without interference with other similar units.

The facility of a device of my invention for providing individually controllable valve connections for a plurality of units, is illustrated by Fig. 4. Although this figure illustrates a multiple compound valve assembly consisting of three separately or collectively controllable compound valves, the same principle may be extended to a greater or less number of valves and associated containers or systems.

The unit of Fig. 4 is constituted partly by a built-up multi-unit assembly in which the individual sleeves, valve bodies, valves, springs, etc., are, or may be, identical with those illustrated by Fig. 2. In Fig. 4 the same reference numerals are employed for designating the corresponding parts of the individual valve units, those parts of the innermost or lowermost unit bearing the suffix letter A, those illustrated at the left of Fig. 4 bearing the suffix B and those to the right of Fig. 4 bearing the suffix C. The tube corresponding to tube 38 of Fig. 2 is designated at 38A, and in the example shown is provided with a somewhat longer hollow stem or rod portion inwardly of its valve 40A.

An arrangement for actuating the three valves 35A, 35B and 35C through manipulation of the tube 38A, consists of a hook-shaped lever 50 carried by a fixed pivot 51, the hook end of the lever 50 engaging an eye or yolk element 52, secured to or formed as a part of the valve 35B. The opposite end of the lever 50, indicated at 53, is formed to constitute a cam follower, kept in engagement with a cam 54 through the action of the valve spring 33B as the cam 54 is rotated by rotation of tube 38A. Lifting and lowering of the follower 53 of lever 50 will serve to actuate the valve 35B between open and closed positions. A similar arrangement serves to actuate the valve 35C, similar actuating parts bearing reference numerals corresponding to those heretofore given, except for the suffix letter C, the follower end 53C being kept in engagement with and actuated by a cam or track 55 formed similarly and arranged parallel to the cam 54. Connection from the tube 38A to the valve stem 30A is effected through the threaded connection which is, or may be, similar to that illustrated by Fig. 2. Since this connection embraces a substantial number of threads and since the valves 35B and 35C may each be actuated completely between their open and closed positions in any single revolution of tube 38A, it will appear that any one of the three valves, 35A, 35B, or 35C, may be opened, while the other two thereof remain closed; further, that any two of the valves may be open while the third remains closed, or that all three may be simultaneously held open, or simultaneously held closed. Otherwise expressed, the three valves are independently operable by a common manipulating and fluid conducting member and yet are rendered susceptible of any desired relation to each other through actuation of the same manipulating member, this being preferably the fluid connection common to the plurality of units. In the unit of Fig. 4, the tube or stem 38A, together with elements 24A and 26A, and the valve 40A, may be removed as a unit, to enable capping the opening if desired, by a cap such as 46. This removal is rendered possible by the fact that when the tube is lifted for removal and again reinserted, the cams 54 and 55 will pass the follower ends of the levers 50, which will swing sufficiently for this purpose.

The multiple arrangement described is of advantage in a refrigerating system in which, for example, separate units are to be exhausted as by a vacuum pump, although a number of other applications for such an assembly will suggest themselves. For example, the multiple unit of Fig. 4 is adaptable with or without minor changes, to liquid dispensing equipment, as for the handling of draught beer, wherein connections for a plurality of supply containers such as barrels, are to be made to a common draught or dispensing line.

A distinct advantage of the individual units of this invention will appear from Fig. 2, in which attention is directed to the extremely small volume of the chamber 22 wherein operates the primary or inner valve 35. Due to this arrangement, any fluid entrapped between the valves 35 and 40, and which might be regarded as waste or loss upon disconneceion of the tube 38, is kept at a minimum. It will appear as a distinct advantage that chamber 22 is never opened to the atmosphere except when valve 35 is closed, and hence exchange losses between the container and the atmosphere are definitely restricted to the volume of chamber 22, the small volume of which keeps the losses at a minimum.

The invention has been described by making specific and detailed descriptive reference only to certain selected embodiments. It will, of course, be understood that this description is to be regarded only as illustrative, and by no means as exhausting the possibilities of the invention as to the parts and their arrangement and combinations, nor as restrictive of the many possible applications of the valved connection, the invention being defined by the appended claims.

I claim:

1. A compound valve structure including a valve body adapted for use in a pressure container, a pair of spaced valve seats, a valve coacting with each of said seats, a stem for each of said valves, through which the valves are reciprocally movable with respect to the body, means yieldably biasing the valves in opposition to release of pressure from the valve body, and a detachable connection between said stems.

2. A compound valve structure including a valve body, a pair of spaced valve seats, a valve coacting with each of said seats, a stem for each of said valves, a valve spring, and a detachable connection between said stems, the spacing of said valves, when the stems thereof are connected, being other than the corresponding spacing between the said valve seats, the valves being arranged to open, selectively, against said spring, under excess pressure in the valve body.

3. In a valved fluid connection, a pair of spaced valve elements, a housing therefor with respect to which the valve elements are arranged for reciprocating movement, spaced valve seats in the housing, means for detachably connecting the valves in spaced relation to enable closing of one of the valves while the other thereof is open, a valve spring common to the valves when so connected, and channels arranged for conducting fluid past the closed valve, when the other valve is open, the spring and valves being so arranged with respect to the housing, that either valve may operate to relieve excess pressure in the valve body when the other valve is open.

4. A valved fluid connection unit including a housing and conducting means, a pair of spaced valves and a pair of spaced valve seats in said housing, a stem for each of said valves, means for detachably connecting said stems whereby to permit opening actuation of one of the valves by manipulation of the other valve when closed, channels for passing fluid from the open valve by the closed valve, a spring tending to seat one of said valves and means, including the spring, coacting with the closed valve for sealing the open valve and conducting means from atmosphere.

5. In a valved fluid connection for use with a pressure container, a valve housing, spaced valve seats and valve chambers in the housing, an inner valve and an outer valve, each valve coacting with one of the said seats, the valves opening, and the seats being presented toward the zone of fluid discharge from the associated container, a stem for each of said valves, means detachably connecting the stems in spaced relation to enable closing one of the valves while the other thereof is open, a spring constituting the closing agency for one of the valves, and biasing the other valve toward closed position when the stems are connected, one of said valve stems being tubular to provide a channel for conducting fluid past the associated valve when closed, and a port in the tubular valve stem positioned to open into one of said valve chambers when the valve in the other chamber is closed.

6. A valved fluid connection unit for fluid containers including an internally threaded sleeve secured in a wall of a container, a valve body externally threaded and seated in said sleeve, an outwardly presented valve seat formed in said body, a valve reciprocable from the seat in the direction of discharge flow, a spring tending to seat the valve, a hollow cap structure threadedly engaging one end of the body, a valve in said cap structure, reciprocally operable with the first said valve, and a sealing element disposed between the cap structure, and the body and sleeve.

7. A valved fluid connection unit for fluid containers, including an internally threaded sleeve adapted to be secured in a wall of a container, a valve body externally threaded and seated in said sleeve, a valve seat formed in said body and presented in the direction of discharge flow from the associated container, a valve operable in the body, and opening with discharge flow, a stem for said valve, a spring carried by one end of the stem, in opposition to discharge fluid flow, a closure threadedly secured to the inner end of the body, the closure being provided with fluid ports and formed to receive and guide the valve stem, and constitute an adjustable abutment for the spring, a cap structure formed of two threadedly connected portions provided with a valve chamber therein, a valve in said chamber and a gasket between the cap structure and the valve body.

8. In a valved fluid connection unit for fluid containers, a valve body, means for detachably securing the valve body to a wall of a container, a valve chamber formed in the body, a valve guide threadedly secured in one end of said body, a cap structure consisting of two threadedly related hollow portions, one of which is provided with threads projecting into and detachably engaging one end of the body, a pair of valve elements, one operable in the valve body and the other operable in the cap structure, a spring for the first said valve, abutting the valve guide and adjustable by threaded movement thereof, the cap structure constituting means permitting removal of the valve element therein, while the other valve element is closed or seated in the valve body.

9. In a valved connection unit for fluid containers, a valve controlling the flow of fluid to or from the associated container, a chamber for said valve, a valve spring, means for actuating the valve from a point externally of the chamber, a second valve element between said valve chamber and the point of introduction or discharge of fluid to the unit, said element being threadedly connected to said control valve through the actuating means therefor, said element being also arranged for actuation into and out of sealing relation responsively to predetermined movement of the valve actuating means, the threaded connection between said valve and valve element being arranged to permit their concurrent movement out of sealing relation, against the loading of the spring, in response to excess fluid pressure behind the valve.

10. In a valved connection unit for fluid containers, two coacting valve assemblies, each including a valve, a valve stem, and a valve housing forming a valve seat and valve chamber; a threaded connection between said valves and a threaded connection between the valve housings, the valves and housings being assembled with the seats presented in the direction of discharge fluid flow from the associated container, a spring coacting with both valves when connected, and biasing them toward closed position, and means for varying the loading of the spring.

11. In a valved connection unit for fluid containers, a valve body structure, two valves within the body structure, and arranged to open in the direction of fluid discharge from the container, a valve stem for each valve, each stem being slidably disposed and reciprocally operable within the body, a detachable connection between the valve stems, a spring opposing opening movement of either valve when the stems are connected, one of the said valve stems being tubular to constitute a fluid connection to the body and arranged for actuation to make and break the connection between the said stems.

12. In a valved connection unit for fluid containers, a valve body structure, a main valve and an auxiliary valve therein, a stem for each of said valves, reciprocally operable within the body, a detachable connection between the stems, and a valve spring arranged, when the stems are connected, to bias both valves toward seating position, the auxiliary valve stem being tubular to constitute a fluid connection to the body and arranged for rotation to make and break the connection between the stems.

LLOYD J. STOUT.